Patented Nov. 7, 1939

2,178,675

UNITED STATES PATENT OFFICE 2,178,675

PROCESS FOR TREATING VEGETABLES

James A. Thomas, Berkeley, Calif., assignor to Esotoo Fumigation Co. Ltd., San Francisco, Calif., a corporation of California No Drawing. Application March 18, 1939, Serial No. 262,785

6 Claims. (Cl. 99—193)

This invention relates to an improved refrigeration process and product for treating harvested vegetables and has for its objects an improved process and product for preventing spoilage and deterioration of such vegetables in a simple manner that is commercially practical from an economical standpoint. Another object is an improved process for accomplishing the desired preservation of harvested vegetables in a condition suitable for human consumption, and preparation thereof for eating, in the usual manner. Other objects and advantages will appear in the specification and claims.

In referring to this process as being a "refrigeration" process, the term "refrigeration" is intended to refer to ice cooling in which the air cooled by the ice passes over or surrounds the vegetables, or the "hydro-cooling" in which the vegetables are cooled from direct contact with the cold water from the melting ice, or both types of refrigeration may be employed.

For purposes of illustration of the hydro-cooling method, an explanation of the present practice with reference to lettuce may be helpful to an understanding of the present invention.

Ordinarily, in the shipment of lettuce, the several layers of lettuce in a crate are separated by crushed ice as well as ice being disposed between adjacent crates, and the entire load is topped by a layer of crushed ice. This practice may be followed in refrigerating spinach, green peas, bunch carrots, bunch beets, celery, cauliflower, broccoli and other leafy vegetables. The crates and layers of vegetables in the crates may or may not be separated from the ice by sheets of paper. In any event the ice upon melting trickles through the vegetables to a greater or lesser extent dependent upon whether paper is used and whether or not the paper is perforate or imperforate. Ordinarily originally imperforate paper is broken when the vegetables are compressed in the crates, so a percolation of ice water from the melting ice is unavoidable, and is deemed desirable by many buyers and shippers.

If air cooling alone is depended upon for maintaining a low temperature, the ice is in the bunkers of cars or storerooms and the usual circulation of cooled air in the car by convection currents is relied upon to cool the vegetables.

Heretofore, where plain ice has been used, there has been appreciable loss due to yeast, mold, and other bacterial action since the spoilage producing organisms are present on the vegetables, and if actual spoilage, insofar as edibility of the vegetables, does not occur, the vegetables change in texture or color to the point where they are less desirable and hence bring lower prices.

Attempts have been made to prevent discoloration, such as by the use of citric acid salts incorporated in the water from which the ice used is formed, and solid $CO_2$ has been suggested, but these attempts have generally been abandoned due, among other things, to being economically prohibitive or unreliable.

Briefly described, this invention comprises the use of ice containing $SO_2$ which is released in gaseous form upon melting of the ice or in both gaseous and liquid form where the ice is used in substantially direct contact with the vegetables so that the water from the melting ice immediately trickles over the vegetables and into any interstices in the vegetables.

The preferable method of forming the ice is to add sodium sulphite, or sodium bisulphite or potassium metabisulphite to the water from which the ice is to be formed, after the water is cooled to about 32° F. The water is agitated continuously during freezing to insure complete and uniform distribution of the chemicals throughout the ice. Of course, liquid sulphur dioxide may be added to the water in the desired quantity, but the powders above enumerated are more easily measured and incorprated in the water to be frozen. In some instances it is desirable to acidify the water where the powders are used, by adding to the water a crystal of an organic acid, such as tartaric acid, to release the $SO_2$ from any of the several compounds, but in many instances the $CO_2$ evolved by the vegetables, when the ice is in contact therewith, is sufficient to accomplish this result.

Since the sodium sulphite, sodium bisulphite, or potassium metabisulphite, should each contain at least about 50% available $SO_2$, naturally to equal the $SO_2$ supplied by liquid $SO_2$ these compounds must be used in double the quantity of the liquid $SO_2$.

In the hydro-cooling method, the ice may contain from about 5 to about 50 parts of $SO_2$ per million parts of water. This is for the so-called leafy vegetables, but higher concentrations may be used for the root or pod vegetables since they are able to stand greater amounts of $SO_2$ without physical reaction.

In the air cooling method, still higher concentrations may be used, according to the area of the room, degree of dissipation and other factors. In fact, in the air cooling method the higher concentrations are desirable due to the fact that the germicidal property of the ice is dependent upon the $SO_2$ gas released during melting.

In the hydro-cooling method, the vegetables, such as asparagus, brussels sprouts, celery, etc., are frequently cooled before or after packing by immersing them partially or completely in water of low temperature by pumping the water over ice and then circulating the water, so cooled, over and through the vegetables. This water may soon become contaminated with spoilage producing organisms and if recirculated through healthy produce, will cause infection thereof that otherwise would not occur. Ice containing $SO_2$ in the proper proportion, will materially assist in controlling the spread of spoilage organisms present in the water that is circulated thereover, and if the $SO_2$ is sufficiently high, the water may be completely sterilized.

It is obvious, of course, that the $SO_2$ in the ice, being of a volatile nature, will result in retarding the growth of the undesirable organisms irrespective of whether the water containing the same comes in direct contact with the vegetables, and thus the ice in bunkers in a car or storage compartment will contribute materially to the desired results by effecting continuous fumigation of the vegetables with the gaseous $SO_2$ irrespective of whether the vegetables are packed in ice, although the cumulative results of the melting ice in which the vegetables are packed and the gas released from the melting ice in the bunkers will be most effective. Also, precooling loaded cars or the like from the ice in bunkers, after loading the vegetables, will act to fumigate the produce, which is highly desirable, and ice of higher $SO_2$ content may be used in the bunkers than is in the ice in contact with the produce in such cars.

The principal objection to attempting to control the growth of undesirable organisms on vegetables by dipping, sprinkling or spraying the same with a fungicide is that these are washed away or diluted by the melting of the ordinary ice now used, and there is no effective control of the dilution on or around the vegetables. By the use of the ice herein described, there is no loss in the effectiveness of the $SO_2$ that is released, prior to melting of the ice, and the fact that the $SO_2$ is uniformly distributed in the ice makes certain that there will be a uniform release of $SO_2$ as the ice melts. Thus the bactericidal and fungicidal effect is continuous and uniform.

It is understood that the ratio of $SO_2$ to water in the ice is governed by the type of organism causing damage, the type of vegetable and part to be preserved against spoilage, and the type of cooling, but in any event, the ice will contain $SO_2$ and it may contain an organic acid salt, the latter merely being to acidify the aqueous $SO_2$ solution to facilitate the release of the $SO_2$, where found desirable to do so.

It is, of course, obvious that an inactive, harmless coloring agent, such as vegetable coloring matter may be added to the water before freezing, to identify the ice, or tags or the like may be frozen in the ice to identify the ice as to $SO_2$ content.

I claim:

1. The process of treating vegetables during packing, shipping, or storage, that includes cooling the vegetables with ice that contains $SO_2$ whereby the $SO_2$ in said ice will be released for effectively contacting the vegetables upon melting of said ice and will thereby cooperate with the lowered temperature to retard the growth of spoilage microorganisms on the vegetables.

2. The process of treating vegetables to retard spoilage by spoilage organisms on said vegetables that includes the step of melting ice containing $SO_2$ and causing the water from the ice so melted including the $SO_2$ therein to contact the vegetables.

3. The method of treating vegetables to prevent spoilage from the activity of microorganisms that comprises the steps of packing the vegetables in ice containing $SO_2$ whereby the $SO_2$ will be released from the ice for contacting the vegetables upon melting of said ice and will thereby retard the activity of spoilage organisms on the vegetables.

4. The method of treating vegetables to prevent spoilage from the activity of microorganisms that comprises releasing $SO_2$ from ice containing $SO_2$ by melting said ice and thereafter causing the cooled air with the $SO_2$ gas therein to circulate through the vegetables and at the same time subjecting the vegetables to contact with water from melted ice that contains $SO_2$ immediately after melting of said ice.

5. The method of treating vegetables that includes the step of passing water over ice that contains $SO_2$ thereby melting said ice and entraining $SO_2$ in the water that is passed over said ice, and thereafter causing said water, with the $SO_2$ entrained therein, to pass over the vegetables.

6. The method of treating vegetables that comprises packing vegetables with ice containing from about 5 parts to 50 parts of $SO_2$ whereby the water resulting from melting of said ice will pass over the vegetables and the vegetables will be contacted by the $SO_2$ released from the ice by melting of the latter.

JAMES A. THOMAS.